United States Patent [19]
Twiford et al.

[11] Patent Number: 4,467,708
[45] Date of Patent: Aug. 28, 1984

[54] STRIPPER FOR FILLING MACHINE

[75] Inventors: Richard L. Twiford, Englishtown; John W. Hood, East Brunswick, both of N.J.

[73] Assignee: International Telephone and Telegraph Corporation, New York, N.Y.

[21] Appl. No.: 362,728

[22] Filed: Mar. 29, 1982

[51] Int. Cl.³ .................. A21C 3/04; A21C 9/06; A21D 8/02
[52] U.S. Cl. .................. 99/450.8; 99/450.7; 141/329
[58] Field of Search .......... 99/450.1, 450.2, 450.6, 99/450.7, 450.8, 532, 533, 516, 353; 141/329 X, 330; 17/25, 32; 426/279–284, 496, 497, 516

[56] References Cited

U.S. PATENT DOCUMENTS

| | | | |
|---|---|---|---|
| 3,465,693 | 9/1969 | Lopata | 99/450.8 X |
| 3,669,005 | 6/1972 | Fullerton | 99/450.1 |
| 3,725,974 | 4/1973 | Kuhlman | 99/450.7 |
| 3,871,274 | 3/1975 | Hornby | 141/329 X |
| 3,915,080 | 10/1975 | White | 99/450.8 |
| 4,162,333 | 7/1979 | Nelson et al. | 99/450.7 X |

*Primary Examiner*—Timothy F. Simone
*Attorney, Agent, or Firm*—John T. O'Halloran; Robert P. Seitter

[57] ABSTRACT

The present invention is a stripping apparatus for a machine that provides a filling in the interior of an article, such as a cake, continuously conveyed through the machine. The machine includes a filling manifold to which filling needles are rigidly attached. The filling manifold is raised and lowered to inject the needles into and retract them from the articles while moving synchronously with the articles. The stripping apparatus substantially prevents relative lateral movement between the articles and stripper bars that contact the articles. The stripping apparatus includes a stripper frame, carrying the stripper bars, that is slidably mounted to the machine frame by slide blocks. Scissors-links that link the slide blocks to the filling manifold synchronize the movement of the stripper bars with the movement of the filling manifold.

20 Claims, 5 Drawing Figures

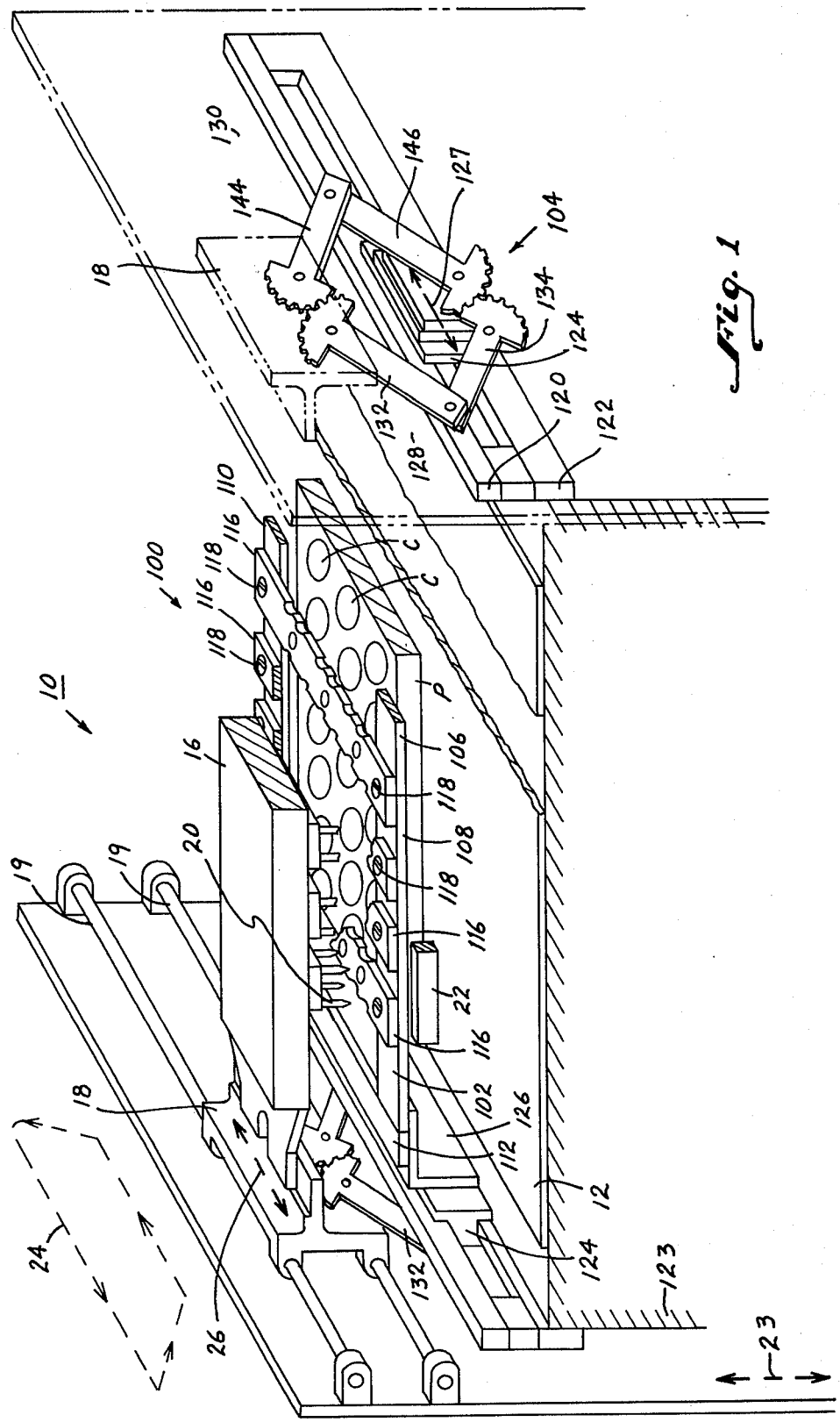

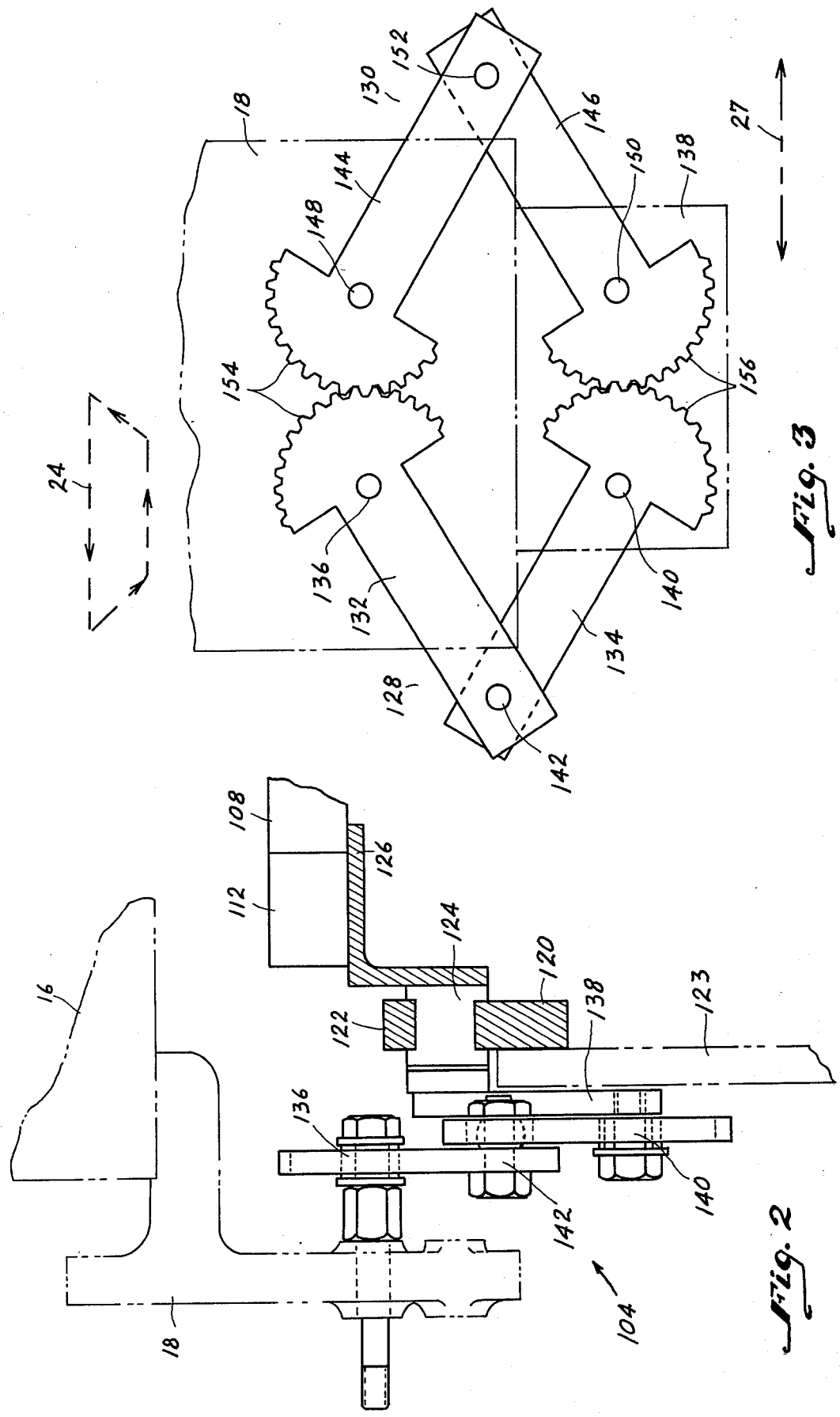

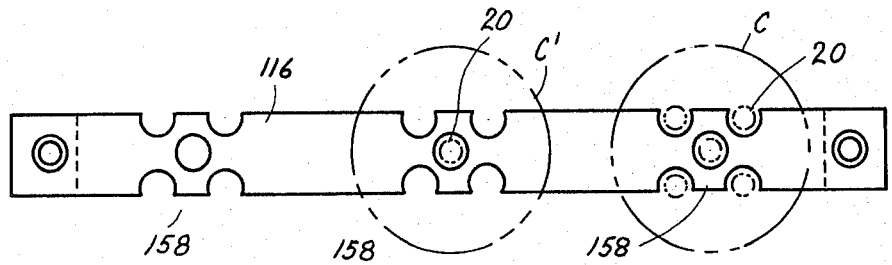
Fig. 4
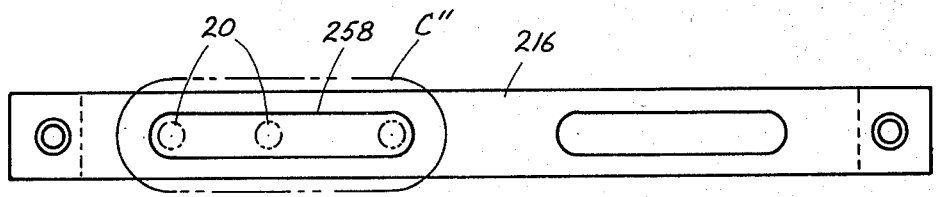
Fig. 5
PRIOR ART
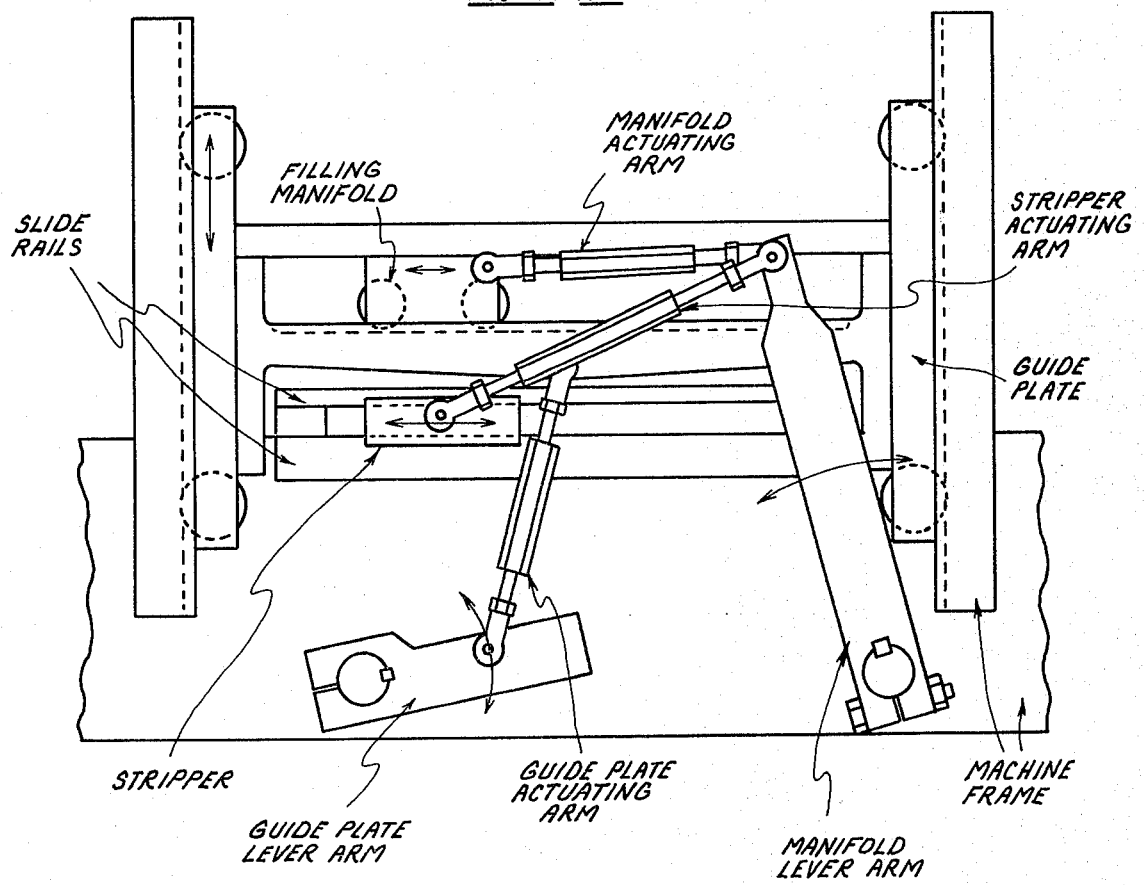

STRIPPER FOR FILLING MACHINE

BACKGROUND OF THE INVENTION

1. Field of the Invention

This invention relates to a filling machine that injects a filling into a food product and, more particularly, to a stripper for removing the food product from the filling needles.

2. Description of the Prior Art

Many food products, especially sponge cakes and cupcakes, contain a filling, such as cream, forced into the product through hollow filling needles. A filling machine continuously advances the cakes, still in their baking pans, under a filling manifold that spans the conveyor transverse to the conveying direction. The filling manifold carries one or more rows of filling-needle clusters. Drive means propel the filling manifold synchronously with the conveyor while at the same time lowering the manifold to inject the cakes with the needles and then raising the manifold to retract the needles after the cakes have been filled. The drive means then returns the filling manifold to its starting position so that the next advancing rows of cakes can be filled with cream.

Because products often tend to adhere to the filling needles as they are retracted, filling machines include structure to strip the products from the filling needles. The stripper holds the product to prevent it from rising with the needle. A common stripping arrangement uses stationary fingers that extend along the direction of conveyor travel just above the product. As the needles are retracted, any product being lifted by the withdrawing needle cluster will contact the rod, which holds the product in place and strips it from the needles. In a filling-needle cluster with four needles, each located at the corners of a square, the stripper usually has one stripper finger running through the middle of the square needle pattern and two running along opposite sides outside the square pattern.

A persistent problem is the large number of torn cakes caused by stationary stripper fingers used with continuous-advance filling machines. The moving cakes contact and rub against the stationary stripper fingers and often are torn. That is a particularly severe problem with very tender cake products such as sponge cake. Locating the stripper fingers as closely as possible to the needles ameliorates the problem because it reduces the amount of tearable cake between a finger and a retracting needle. However, a safety mechanism incorporated into many filling machines interrupts power to the machine if the needles, which are metallic, are grounded by contacting any other metal surface. If the stripper fingers are too close to the needles, a small bend in either the needle or the finger will automatically stop the machine. That safety mechanism is intended to prevent damage to the machine by stopping the machine if, for example, a baking pan becomes misaligned and a descending needle hits it. If the machine shut down every time a slightly misaligned filling needle contacted a stripper finger, however, it would significantly impede production.

Stripper fingers made of non-metallic materials would prevent inadvertent machine shutdown but would not be rigid enough. Metallic fingers can be covered with a non-metallic material, but that only temporarily solves the problem. A misaligned needle that repeatedly rubs on the non-metallic covering will eventually wear it away. The needle can then contact the metallic finger and cause machine shutdown.

In any event, the use of stationary stripper fingers, even when located as closely as possible to the filling needles, is at best only a partial solution. The stationary fingers still rub against the moving cakes and tear them. And stationary stripper fingers are for the most part impracticable if the filling needles are arranged in clusters of five instead of four, with the fifth needle in the center of the square four-needle cluster. A fifth needle provides a denser, more concentrated and therefore more suitable cream filling, but also prevents the use of the middle stripper finger. The elimination of that finger makes it virtually impossible to strip the cake without tearing.

A filling machine, built by Oakes Machine Corporation of Islip, New York, has been modified to use a stripping arrangement other than stationary stripper fingers. The Oakes filling machine is used to fill with cream cake products continuously conveyed through the machine in their baking pans. The drive means includes pneumatic cylinders, timed by a camming arrangement run by the conveyor drive, to propel the filling manifold. One end of a manifold lever arm pivotally mounts to the machine frame and the other end is attached to the filling manifold by a manifold actuating arm. The filling manifold at its ends slidably mounts to guide plates. The pneumatic cylinders reciprocate the manifold lever arm, which slides the filling manifold along the direction of movement of the conveyor. Separate pneumatic cylinders, acting through guide plate lever-arm-actuating-arm assembly, raise and lower the guide plates, and the moving filling manifold, to inject the filling needles into and retract them from the moving cakes.

The stationary stripper finger arrangement was removed from the Oakes filling machine. A pair of slide rails were attached to the machine frame. A stripper was mounted to the slide rails so that it could be reciprocated along the direction of movement of the conveyor. In an attempt to eliminate lateral relative movement between the stripper and the cake, the stripper was attached to the manifold lever arm by a stripper actuating arm. So as the manifold lever arm reciprocated the filling manifold, it reciprocated the stripper, too. The stripper itself was a stripper frame having flat stripper bars. The flat stripper bars had openings through which the filling needles passed into the cakes.

The flat stripper bars with openings, used on the modified Oakes filling machine, lessened the tearing problem encountered with the five-needle cluster. However, the arrangement used to reciprocate the stripper did not, and could not, be precisely synchronized with the moving cakes. No matter how the geometry of the manifold-lever-arm, manifold-actuating-arm, stripper-actuating-arm system was manipulated, there remained relative movement between the cakes and the stripper bars. Even though the amount of relative movement between the stripper bars and the cakes could be reduced, it could not, even under the best of circumstances, be made small enough to prevent tearing a significant number of cakes. In addition, because of the relative movement between the filling needles and the stripper bars, the openings in the stripper bars had to be elongated. The resulting slots had the effect of increasing the distance between the stripper and the filling needle, exacerbating the tearing problem.

U.S. Pat. No. 3,871,274 to Hornby shows a continuous-advance doughnut filling machine in which a stripper moves with the doughnuts. The Hornby machine has a filling head driven synchronously with a row of doughnuts moving along a conveyor. The filling head is raised and lowered as it moves with the doughnuts. A stripper plate rigidly mounts to the filling head. While the filling head is down, the filling needles are extended from the filling head through the stripper and into the doughnuts. After filling the doughnuts, the needles are retracted into the filling head, which then is raised and returned to its starting position. Because in the Hornby machine the filling needles must move relative to the filling head, it is inherently less reliable than machines having the filling needles rigidly secured to a filling head or manifold. Furthermore, reliability decreases quickly if more products are to be filled at one time, which limits the capacity of the Hornby machine. No prior art stripping apparatus is known that eliminates relative lateral movement between the stripper and the product in the simpler and more reliable filling machines having filling needles rigidly attached to the filling manifold.

SUMMARY OF THE INVENTION

The present invention is a stripping apparatus that comprises stripper means and synchronizing means. The stripper means contacts and strips from a filling needle an article moving through a filling machine having the filling needle rigidly secured to filling means that is movably mounted to the machine frame to inject the filling needle into and retract the filling needle from the moving article while the filling means moves in synchronization with the article. The synchronizing means links the stripper means to the filling means to move the stripper means with the article while substantially preventing relative lateral movement between the stripper means and the article as the filling means retracts the filling needle.

BRIEF DESCRIPTION OF THE DRAWINGS

FIG. 1 is an isometric view of a filling machine incorporating one embodiment of the stripping apparatus of the present invention.

FIG. 2 is a detailed view of the synchronizing means of the embodiment of the present invention shown in FIG. 1.

FIG. 3 is a schematic depiction of the synchronizing means of the embodiment of the present invention shown in FIG. 1.

FIG. 4 is a detailed view of the stripper bar used in the embodiment of the invention shown in FIG. 1.

FIG. 5 is a detailed view of an alternate embodiment of a stripper bar suitable for use with elongated cake products.

The "Prior Art" figure illustrates the stripping arrangement used with limited success on the modified Oakes filling machine described above.

DETAILED DESCRIPTION OF THE INVENTION

FIG. 1 shows the stripping apparatus of the present invention installed on a schematically depicted filling machine of the type marketed by Goodway Industries, Inc. of Bohemia, Long Island. The filling machine 10 has a continuously moving conveyor 12 that propels baking pans P through the machine. The baking pans P have recesses that carry baked cake products C. The baking pans P carry a plurality of the cakes C in rows running across the conveyor 12. Each row usually contains 20 or so cakes, depending on the cake product being made. Each baking pan P has a number of rows of cakes C, typically two or three, again depending on the size and shape of the cake product being made. Before the baking pans P reach the filling machine 10, the recesses are filled with cake batter and the baking pans P pass through an oven that bakes the batter to make the cake products C. After a suitable period, in which the newly baked cakes cool, the baking pans P are conveyed to the filling machine 10 to fill the cake products with a suitable filling, such as foamed cream.

The filling machine 10 comprises a pair of guide plates 14 mounted in mutually facing relationship on opposite sides of the conveyor 12. A filling manifold 16 is rigidly mounted at each end to manifold mounting brackets 18 that are slidably attached to the guide plates 14 by guides 19. The filling manifold 16 has rigidly mounted to it clusters of filling needles 20. The size, arrangement and number of filling needles 20 in each cluster depends on the size of the cake product being filled. The number of clusters of filling needles 20 and their arrangement matches the number and arrangement of cakes C carried by the baking pan P. The filling manifold 16 is usually removably secured to the manifold mounting brackets 18 by bolts (not shown) so that filling manifolds can be removed for cleaning or to exchange one filling manifold for another having different filling needles or filling needle patterns. The conveyor 12 incorporates a pusher bar 22 that pushes the baking pans P.

In operation, drive means (not shown) propel the manifold mounting brackets 18 along the guides 19 in synchronization with the conveyor 12 during a forward stroke of the manifold mounting brackets 18. During the forward stroke, the drive means lowers the guide plates 14 (as shown by the dotted arrow 23) and the filling manifold 16 to inject the filling needles 20 into the cakes C. While the filling needles 20 are in the cakes C, cream is forced by suitable means (such as air pressure) from the filling manifold 16 through the filling needles 20 into the interior of the cakes C. The forward stroke of the manifold mounting brackets 18 terminates when the guide plates 14 have raised the filling manifold 16 to retract the filling needles 20 from the cakes C. The drive means then repositions the manifold mounting brackets 18 in a return stroke to ready the filling manifold 16 for injection of the filling needles 20 into the cakes carried by the next baking pan. The compound motion of the filling manifold 16 is generally shown by the dotted arrow 24 in FIG. 1.

The forward component of the motion of the filling manifold 16 (shown by the dotted arrow 26) is fully synchronized with the motion of the cakes C to prevent relative lateral movement between the filling needles 20 and the cakes C while the filling needles 20 are within the cakes C. The pusher bar 22 precisely positions the baking pan P on the conveyor 12 so that with a particular baking pan, cake size and filling manifold, the filling needles 20 enter the cakes C at the proper place.

FIG. 1 enables a clearer understanding of shortcomings of the prior art stationary stripper fingers. The stripper fingers were mounted to the machine frame and extended along the direction of travel of the baking pans just above the surface of the cakes C. Any cake tending to adhere to a retracting filling needle cluster 20 would be "wiped" along the bottom of the stationary stripper fingers flanking the filling needles in the cluster.

The stripping apparatus 100 of the present invention comprises a stripper means 102 and a synchronizing means 104. The stripper means 102 includes a substantially rigid stripper frame 106 having two mutually parallel frame members 108 and 110 held at their ends in spaced relationship by stripper spacer arms 112 (only one of which is shown in FIG. 1.). The frame members 108 and 110 and the spacer arms 112 are welded together. They typically are made of stainless steel for sanitary reasons. A plurality of stripper bars 116 span the frame members 108 and 110. The number of stripper bars 116 is the same as the number of cakes C in a row and the spacing of the stripper bars 116 is identical to the spacing of the cakes C in the row. Screws 118 removably secure the stripper bars 116 to the frame members 108 and 110.

The stripper means 102 includes a first slide rail 120 and a second slide rail 122 secured to a frame member 123 of the machine 10. The slide rails 120 and 122 are mutually parallel and extend along the direction of travel of the conveyor 12. There is a corresponding pair of slide rails 120 and 122 on both sides of the conveyor 12. The slide rails 120 and 122 mount slide blocks 124 between them. Stripper frame mounting brackets 126 mount to the slide blocks 124. The spacer arms 112 are rigidly but removably secured to the stripper frame mounting brackets 126 by screws (now shown) like the screws 118. The slide blocks 124 and slide rails 120 and 122 thus mount the stripper frame 106 for reciprocating movement along the direction of travel of the conveyor 12 as shown by the dotted arrow 127.

FIGS. 1, 2 and 3 best illustrate the synchronizing means 104 of the present invention. The synchronizing means 104 comprises a linkage connecting the manifold mounting brackets 18 to the slide blocks 124 at both sides of the conveyor 12. Each linkage means includes a first scissors-link 128 and second scissors-link 130 disposed between the manifold mounting bracket 18 and slide block 124. The first scissors-link 128 comprises a first bracket or mounting-means link 132 and a first slide link 134. The first bracket link 132 is pivotally mounted near one end by a bearing 136 to the manifold mounting bracket 18. The first slide link 134 is pivotally mounted near one end to an extension plate 138 by a bearing 140. The extension plate 138 is rigidly attached to the back of the slide block 124. At their other ends the first bracket link 132 and the first slide link 134 are pivotally mounted to each other by a bearing 142. The second scissors-link 130 comprises a second bracket or mounting-means link 144 and a second slide link 146. The second bracket link 144 is pivotally mounted near one end to the manifold mounting bracket 18 by a bearing 148. The second slide link 146 is pivotally mounted near one end to the extension plate 138 by a bearing 150. At their other ends the second bracket link 144 and second slide link 146 are pivotally mounted to each other by a bearing 152. The bracket links 132 and 144 have meshed gear segments 154 welded to their first ends. The slide links 134 and 146 have meshed gear segments 156 secured to their first ends. The links 132, 134, 144 and 146 are the same length.

The stripper bars 116 in FIG. 1 are shown in more detail in FIG. 4. The stripper bar 116 can be used when filling cupcakes and other round cake products with a cream filling. Each stripper bar 116 has three cut-out patterns 158. The cut-out pattern 158 in the stripper bar 116 is used with a machine having the filling needles 20 in five-needle clusters. The position of the filling needles when they pass through the cut-out pattern 158 is shown in phantom lines in FIG. 4. The cut-out pattern 158 will also accommodate a single filling needle. For smaller cakes, like those having the diameter of the cake product C' illustrated at the center cut-out pattern 158, only a single, sometimes larger, needle is required. The smaller diameter cake products C' are often baked in baking pans in which their relative position is the same as the larger diameter cake products C. The stripper bar 116 can conveniently be used for both cake products in that case.

In operation, the stripper means 102 contacts an article moving through a filling machine to strip the product from a filling needle 20 that is rigidly attached to a moving filling means 16. The synchronizing means 104, by linking the stripper means to the filling means 16, substantially prevents relative lateral movement between the stripper means 102 and the article as the filling means 16 retracts the filling needle 20.

The synchronizing means 104 of the present embodiment comprises scissors-links that reciprocate the stripper frame 108 in the slide rails 120 and 122 while permitting the compound motion of the manifold mounting brackets 18 necessary to inject and retract the filling needles during the forward stroke of the guide plates 14.

Beginning at the start of the forward stroke of the filling manifold 16, the drive means lowers the filling manifold 16 to inject the clusters of filling needles 20 into the cakes C while advancing the filling manifold 16 synchronously with the cakes. The filling needles 20 pass through the cut-out patterns 158 to reach the cakes C. As the forward stroke of the filling manifold 16 ends, it is raised to retract the filling needles 20 from the cakes C. During the entire forward stroke of the filling manifold 16, the scissors-links 128 and 130 move the stripper frame 106 in synchronization with the mounting brackets 18 and prevent relative movement between the stripper bars 116 and the cakes C. While the filling needles 20 dwell in the cakes C, a suitable filling is forced from the filling manifold 16 into the cakes C. The scissors-links 128 and 130 permit vertical motion of the filling manifold 16 even though the slide blocks 124 can only move horizontally along the direction of motion of the conveyor.

FIG. 3 depicts the linkage means schematically and best illustrates its operation. The gear segments 154 and 156 prevent relative rotation of the bracket links 132 and 144 and relative rotation of the slide links 134 and 146 when a force is applied to the manifold mounting brackets 18 along the path of the slide rails 120 and 122, which is along the direction of movement of the conveyor 12 (the direction of arrow 26). The links 132, 134, 144 and 146 thus transmit that force to the slide blocks 124 in that same direction, which minimizes any tendency of the slide blocks 124 to bind in the slide rails 120 and 122. The gear segments 154 and 156 freely permit relative rotation of the manifold links 132 and 144 and relative rotation of the slide links 134 and 146 when a force is applied to the manifold mounting brackets 18 normal to the path of the slide rails 120 and 122 to raise or lower the filling needles 20 (the direction of arrow 23). Thus no force is transmitted to the slide blocks 124 in that direction, which allows the manifold mounting brackets 18 to raise and lower the filling manifold 16 as if the stripping apparatus 100 were not present.

FIG. 5 shows an alternate embodiment 216 of the stripper bars 116. Because the stripper bars 116 are mounted to the stripper frame by screws 118, one stripper bar is easily substituted for another. For example, stripper bar 216 has a cut-out pattern 258 that is an elongated slot. The stripper bar 216 is particularly suited for filling elongated cake products C" using a filling manifold having filling-needle clusters comprising three filling needles in a row.

The stripper bars 116 of the present invention are typically made of a non-metallic material such as Delrin, a trademark of E. I. DuPont for acetal resin. The present invention enables the stripper bars to be made short enough so that they will be sufficiently rigid if made from a non-metallic material. It is desirable that the clearance between the filling needles and the stripper bars, when the filling needles pass through the cut-out patterns, be as small as possible. A small clearance minimizes the tendency for the filling needles to tear out part of the cake, particularly if it is a very tender cake product such as sponge cake. However, as discussed above, filling machines of this type typically include an electrical circuit that interrupts power to the machine if any of the metallic filling needles is grounded by touching other metallic structure. Making the stripper bars of non-metallic material prevents the inadvertent machine shut-down that might result if a filling needle were slightly misaligned and rubbed against the stripper bar as it passed through the cut-out pattern.

The filling machine used to illustrate the present invention is made by Goodway Industries in several models. Different models use a different drive means for driving the guide plates 14 and the manifold mounting brackets 18, or the machine frame member 123 (see FIG. 2) may have a different thickness in different models. Such variations between machines might necessitate modifications of the present invention. For example, the machine depicted in FIG. 2 has a frame member 123 that is ⅝" thick. Other models have a frame member at that location ¾" thick. The spacer between the frame member 123 and the extension plate 138 will then be replaced by a different spacer having a different thickness. In any event, one having ordinary skill in the art will be capable of modifying the present invention, or the machine, to incorporate the present invention into any filling of this type machine. Those having ordinary skill in the art will also recognize other modifications that may be made to the present invention without departing from the scope thereof, which is solely defined by the following claims.

We claim:

1. In a filling machine having filling means including a filling needle and drive means for propelling said filling means in a direction generally parallel to conveyor means for moving an article through said machine and for injecting and retracting said filling needle into and out of an article on said conveyor means, a stripping apparatus, said stripping apparatus comprising stripper means for contacting and stripping an article on said conveyor means from said filling needle and synchronizing means for linking said stripper means to said filling means to move said stripper means with an article on said conveyor means while substantially preventing lateral movement between said stripper means and an article on said conveyor means as said filling means retracts said filling needle.

2. In a filling machine as recited in claim 1 wherein the filling means is rigidly secured to mounting means and wherein the drive means has a forward stroke in which the filling needle is injected into and retracted from the article by the mounting means and wherein the drive means has a return stroke in which the mounting means is repositioned for another forward stroke, said synchronizing means further including linkage means for linking said stripper means to the mounting means substantially to prevent the relative movement between said stripper means and the article as the mounting means retracts the filling needle.

3. In a filling machine as recited in claim 2 wherein:
said stripper means includes a slide block for movably mounting said stripper means to a machine frame for reciprocation along the direction of movement of the conveyor means; and
said linkage means is secured to said slide block for reciprocating said stripper means with the forward and return strokes of the mounting means.

4. In a filling machine as recited in claim 3 having two mounting means on opposite sides of the conveyor, wherein said stripper means includes:
two slide rail means for mounting to the machine frame on opposite sides of the conveyor;
two said slide blocks mounted in said slide rail means; and
a substantially rigid stripper frame secured to said slide blocks.

5. In a filling machine as recited in claim 4 wherein said stripper frame includes:
two mutually parallel stripper frame members held at their ends in spaced relationship by stripper spacer arms rigidly secured to said slide blocks; and
a plurality of equally spaced stripper bars, wherein each said stripper bar spans said stripper frame members and includes a cut-out pattern for passage of the filling needle therethrough.

6. In a filling machine as recited in claim 5 wherein each said stripper bar includes a number of equally spaced cut-out patterns.

7. In a filling machine as recited in claim 6 wherein each said cut-out pattern comprises a central opening and four flanking cutouts surrounding said central opening in a square pattern.

8. In a filling machine as recited in claim 6 wherein each said cut-out pattern is an elongated slot for accepting therethrough a plurality of filling needles aligned along the direction of conveyor movement.

9. In a filling machine as recited in claim 5 wherein said stripper bar is a non-metallic material.

10. In a filling machine as receited in claim 9 wherein said non-metallic material is acetal resin.

11. In a filling machine as recited in claim 3 wherein:
said linkage means comprises a first and a second scissors-link for synchronizing the reciprocating motion of said slide block and the mounting means;
said first scissors-link includes a first mounting-means link and a second slide link, said second mounting-means link link and a first slide link, said first mounting-means being pivotally mounted to the mounting means at one end of said first mounting-means link, said first slide link being pivotally mounted to said slide block at one end of said first slide link and said first mounting-means link and first slide link being pivotally mounted to each other at the other ends thereof;
said second scissors-link includes a second mounting-means link and a second slide link, said second mounting-means link being pivotally mounted at one end to the mounting means, said second slide link being pivotally mounted at one end to said slide block and said second slide link and said second mounting-means link being pivotally mounted to each other at the other ends thereof; and said first and second mounting-means links include meshed gear segments at said one end thereof, and said first and second slide links include meshed gear segments at said one end thereof, for preventing relative rotation of said links upon application of a force to the mounting means along the direction of movement of the conveyor means and permitting relative rotation of said links upon application of a force to the mounting means normal to direction of movement of the conveyor means.

12. In a filling machine as recited in claim 11 having two mounting means on opposite sides of the conveyor means, said stripping apparatus further comprising two said linkage means, wherein:

said stripper means includes two slide rail means for mounting to the machine frame on opposite sides of the conveyor, two said slide blocks for mounting an opposite sides of the conveyor in said slide rail means and a substantially rigid stripper frame secured to said slide blocks; and each said linkage means is secured to one of said slide blocks for synchronized reciprocation of said slide blocks.

13. In a filling machine as recited in claim 12 wherein said stripper frame includes:

a pair of mutually parallel stripper frame members held at their ends in spaced relationship by stripper spacer arms rigidly secured to said slide blocks;

a plurality of equally spaced stripper bars; and each said stripper bar spans said stripper frame members and includes a number of similarly spaced cut-out patterns for passage of the filling needle therethrough.

14. In a filling machine as recited in claim 13 wherein each said cut-out pattern comprises a central opening and four flanking cutouts surrounding said central opening in a square pattern.

15. In a filling machine as recited in claim 13 wherein each said cut-out pattern is an elongated slot for accepting therethrough a plurality of filling needles aligned along the direction of conveyor movement.

16. A filling machine for forcing a filling into baked cake products, the machine comprising:

a conveyor for continuously propelling baking pans containing baked cake products arranged in a number of rows each containing a plurality of cake products;

a filling manifold having a plurality of filling needles for forcing a filling contained in said filling manifold through said filling needles, wherein said filling needles are rigidly secured to said filling manifold in clusters containing at least one filling needle and said clusters are similarly arranged in a like number of rows each containing a like plurality of filling needle clusters;

two mounting means movably mounted to a machine frame on opposite sides of said conveyor, each said mounting means including a filling manifold mounting bracket for removably securing said filling manifold over said conveyor;

drive means for propelling said mounting means in a forward stroke synchronized with the forward movement of the conveyor in which said drive means lower said filling manifold to inject said filling needles into the cake products for enabling the filling to enter the cake product interior through said filling needles and raise said filling manifold to retract said filling needles from the cake products and in a return stroke in which said drive means reposition said filling manifold for another forward stroke;

two slide rail means comprising spaced slide rails mounted to the machine frame on opposite sides of the conveyor;

two slide blocks mounted on opposite sides of the conveyor between said slide rails;

a substantially rigid stripper frame including two mutually parallel stripper frame members held at their ends in spaced relationship by stripper spacer arms removably secured to said slide blocks and a like plurality of similarly arranged stripper bars for contacting and stripping from a retracting filling-needle cluster a cake product, wherein each said stripper bar includes a like number of similarly spaced cut-out patterns for passage of said filling needles therethrough for injection into the cake products; and two linkage means for linking said slide blocks to said mounting brackets substantially to prevent relative movement between said stripper bars and the cake product during the forward stroke of said filling manifold.

17. The filling machine recited in claim 16 wherein:

each said linkage means comprises a first and a second scissors-link for synchronizing the reciprocating motion of respective said slide blocks and said filling manifold mounting brackets;

said first scissors-link includes a first bracket link and a first slide link, said first bracket link being pivotally mounted to said mounting bracket at one end of said first bracket link, said first slide link being mounted to said slide block at one end of said first slide link and said first bracket link and first slide link being pivotally mounted to each other at the other ends thereof;

said second scissors-link includes a second bracket link and a second slide link, said second bracket link being pivotally mounted at one end to said mounting bracket, said second slide link being pivotally mounted at one end to said slide block and said second slide link and said second bracket link being pivotally mounted to each other at the other ends thereof; and said first and second bracket links include meshed gear segments at said one end thereof, and first and second slide links include meshed gear segments at said one end thereof, for preventing relative rotation of said links upon application of a force to the mounting means along the direction of movement of the article and permitting relative rotation of said links upon application of a force to the mounting means normal to the direction of movement of the cake product.

18. The filling machine recited in claim 16 or 17 wherein:

said filling needle clusters include five needles with a central filling needle and four flanking filling needles surrounding said central needle in a square pattern; and said cut-out patterns in said stripper bars comprise a central opening and four flanking cut-outs surrounding said central opening in a pattern complementary to said filling needle cluster.

19. The filling machine recited in claim 16 or 17 wherein:

said filling needle clusters include three needles aligned along the direction of movement of said conveyor; and said cut-out pattern comprises an elongated slot for accepting said three-needle cluster therethrough.

20. The filling machine in claim 16 or 17 wherein said stripper bars are a non-metallic material.

* * * * *